Feb. 21, 1956    J. H. CAPPS    2,735,974
MULTISPEED ELECTRIC MOTOR PROTECTIVE CIRCUIT
Filed June 10, 1955
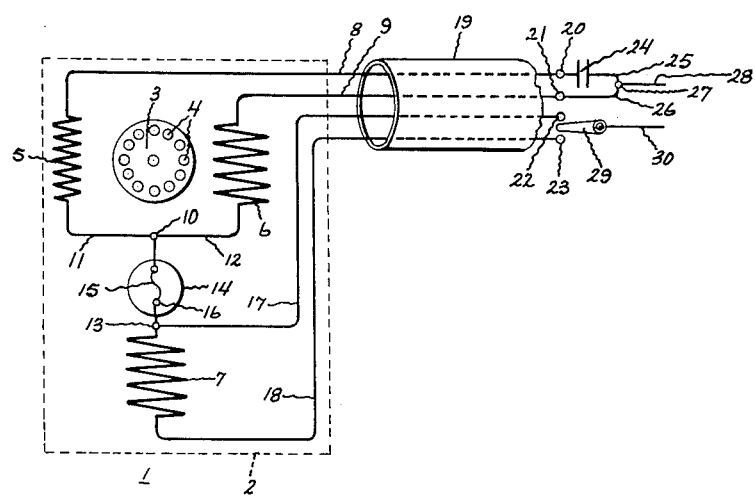
Inventor:
James H. Capps,
by Robert G. Irish
His Attorney.

United States Patent Office 2,735,974
Patented Feb. 21, 1956

2,735,974

MULTISPEED ELECTRIC MOTOR PROTECTIVE CIRCUIT

James H. Capps, Fort Wayne, Ind., assignor to General Electric Company, a corporation of New York Application June 10, 1955, Serial No. 514,513

2 Claims. (Cl. 318—220)

This invention relates to dynamoelectric machines, and more particularly to an improved protective circuit for multispeed single phase alternating current induction-type motors.

Single phase alternating current induction-type motors conventionally include a squirrel cage rotor, and a stator concentrically arranged therearound and provided with a main winding and an auxiliary winding connected in parallel. A capacitor is arranged in series with the auxiliary winding to provide a phase displacement from the main winding. The auxiliary winding and the capacitor may be permanently connected across the main winding or, in the alternative, means may be provided to disconnect them as the motor comes up to speed.

In the past, such motors have generally been sold as an entire unit, the capacitor being made part and parcel of the motor to be sold. Recently, however, the trend has changed and it is now becoming customary to sell such motors without the capacitor, the intent being that the purchaser of the motor connect the capacitor in the prescribed manner; leads extending from the motor are provided for this purpose. Where multispeed motors of the type which have a plurality of main winding sections all connected in series, with only one section being connected in the circuit for the highest speed, two for the next highest speed, and so on, are provided, the new system of connecting the capacitor for the auxiliary winding after the motor reaches the customer has hitherto precluded adequate thermal protection for the motor windings by a single thermal protector. Previously, the single thermal protector was provided in series with all the windings; in order to do this, the protector was located in the circuit at one end thereof, beyond the auxiliary winding and the capacitor. This became impossible with the newer motors since the end of the circuit including the capacitor occurred outside the motor. Consequently, in multispeed motors having an auxiliary winding where conductors were provided so as to permit connection of the capacitor outside the motor, it has been necessary to provide as many protectors as running speeds in order to protect all the windings of the motor. It is most desirable to eliminate the cost of the additional thermal protectors and to provide protection for the windings of such a motor with a single protector despite the physical location of the auxiliary winding capacitor outside the motor.

It is, therefore, an object of this invention to provide a multispeed alternating current induction-type motor of the type having an auxiliary winding adapted to be connected in series with a capacitor physically located outside the motor which will incorporate the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In its broadest aspect, this invention provides a multispeed single phase alternating current induction-type motor including an auxiliary winding and a plurality of main winding sections. The auxiliary winding and at least one of the main winding sections are connected in parallel, and all of the main winding sections are connected in series. A conductor extends from one end of the auxiliary winding to a point accessible from outside the motor and is adapted to be connected through a capacitor to one side of a source of power. A second conductor extends from one end of the section which is in parallel with the auxiliary winding to a point accessible from outside the motor and is adapted to be connected to the same side of the source of power. Additional conductors respectively extend from the other end of each of the main winding sections to points accessible from outside the motor and are adapted to be connected to a switch so as to be selectively connected to the other side of the source of power. A thermal protector is in series with the auxiliary winding and all the main winding sections and is connected between the auxiliary winding and the main winding section in parallel therewith on the one hand and that one of the additional conductors which extend from the other end of the section in parallel with the auxiliary winding on the other hand. In this manner, at all speeds including the highest speed where only the section in parallel with the auxiliary winding is selected, there will be adequate thermal protection because the protector will be in series with all the windings being used.

In the drawing, the single figure is a schematic diagram of the improved circuit of this invention.

Referring to the figure of the drawing, there is shown a single phase alternating current motor generally identified as 1, the confines of which are indicated by dotted outline 2. Motor 1 is of the induction type with a squirrel cage rotor 3 having bars 4 which are short circuited together at each end (not shown). An auxiliary field winding 5 and a pair of main field winding sections 6 and 7 are also provided. A conductor 8 extends from auxiliary winding 5 to a terminal 20 accessible from outside motor confine 2, and a similar conductor 9 extends from the end of main winding section 6 to terminal 21. At their other ends, auxiliary winding 5 and main winding section 6 are connected together at point 10 by conductors 11 and 12 respectively. Main winding section 7 is connected through point 13 and thermal protector 14 to point 10. Protector 14 may be of any standard type, such as, for instance, the type having a bimetallic element 15 which deflects away from point 16 to break the circuit when a predetermined temperature is reached.

A conductor 17 extends from point 13, at the other end of winding section 6 from conductor 9, to terminal 22, and, from the end of winding section 7 which is electrically remote from section 6, a conductor 18 similarly extends outside the motor to terminal 23. Conductors 8, 9, 17 and 18 may be arranged within an insulating covering 19 so that a single opening in the motor casing 2 is all that is necessary for the four conductors which terminate respectively at terminals 20, 21, 22 and 23. It will, of course, be understood that while the four conductors have been shown as extending outside the motor through an insulating coating 19, other equivalent arrangements such as, for instance, a terminal board where the terminals 20, 21, 22, and 23 will be provided, may be used without departing from the invention.

Conductor 8 is adapted to be connected at terminal 20 to a suitable capacitor 24 so that the capacitor is, in effect, in series with the auxiliary winding 5. Conductors 8 and 9 may be joined through conductors 25 and 26 at point 27, and a conductor 28 may then be provided to connect the motor 1 to one side of a source of alternating current power. Terminals 22 and 23 of conductors 17 and 18 respectively are adapted to be selectively engaged by a switch arm 29 connected to a line 30 which in turn is connected to the other side of the source of power so that motor 1 is connected across the source.

When switch arm 29 is moved into engagement with terminal 22, current will flow through auxiliary winding 5, main winding section 6, and the thermal protector 14 so that both of the used windings are thermally protected. If the lower speed should be desired, switch arm 29 is moved into engagement with terminal 23. This then connects main winding section 7 in series with main winding section 6 and auxiliary winding 5. As before, the thermal protector 14 is in series with the auxiliary winding and with all main winding sections at all times when they are connected in the circuit so that protection is always afforded to those windings or winding sections connected across the source of power.

It will be seen from the foregoing that, although the capacitor is connected outside the confines of motor 1, the circuit is such as to provide for connection of a single thermal protector 14 in the circuit so that it will protect all windings connected across the source of power at all times.

While the invention has been described by the illustration of a two speed motor, that is, a motor having two main winding sections, it will be understood that additional sections may be added in the same manner as main winding section 7, with one section being added for each additional speed desired. In addition, it will be readily apparent that the invention is also applicable to capacitor-start motors, where the auxiliary winding and the capacitor are disconnected as the motor comes up to speed, as well as to the capacitor-run motor described hereabove. Therefore, while this invention has been explained by describing a particular embodiment thereof, it will be apparent that improvements and modifications may be made without departing from the scope of the invention as defined in the appended claims.

What I claim as new and desire to secure by Letters Patent of the United States is:

1. A multispeed single phase alternating current induction-type motor including an auxiliary winding and a plurality of main winding sections, said auxiliary winding and at least one of said sections being connected in parallel, all of said sections being connected in series, a conductor extending from one end of said auxiliary winding to a point accessible from outside said motor and adapted to be connected through a capacitor to one side of a source of power, a second conductor extending from one end of said one section to a point accessible from outside said motor and adapted to be connected to said one side of said source of power, additional conductors respectively extending from the other end of said one section and from the end of each additional section which is electrically remote from said one section to points accessible from outside said motor and adapted to be connected to a switch thereby to be selectively connected to the other side of said source of power, and a thermal protector in series with said auxiliary winding and all said sections and connected between said auxiliary winding and said one section on the one hand and that one of said additional conductors that extends from the other end of said one section on the other hand.

2. A two-speed single phase alternating current induction-type motor including an auxiliary winding and a pair of main winding sections, said auxiliary winding and one of said sections being connected in parallel, both of said sections being connected in series, a conductor extending from one end of said auxiliary winding to a point accessible from outside said motor and adapted to be connected through a capacitor to one side of a source of power, a second conductor extending from one end of said one section to a point accessible from outside said motor and adapted to be connected to said one side of said source of power, a pair of additional conductors respectively extending from the other end of said one section and from the end of each additional section which is electrically remote from said one section to points accessible from outside said motor and adapted to be connected to a switch thereby to be selectively connected to the other side of said source of power, and a thermal protector in series with said auxiliary winding and both said sections and connected between said auxiliary winding and said one section on the one hand and that one of said additional conductors that extends from the other end of said one section on the other hand.

No references cited.